(12) United States Patent
Freeman et al.

(10) Patent No.: US 11,170,491 B1
(45) Date of Patent: *Nov. 9, 2021

(54) SYSTEM AND METHOD FOR ASSESSING A PHYSICAL STRUCTURE

(71) Applicant: STATE FARM MUTUAL AUTOMOBILE INSURANCE COMPANY, Bloomington, IL (US)

(72) Inventors: James M. Freeman, Normal, IL (US); Patrick H. Boyer, Bloomington, IL (US); Nicholas U. Christopulos, Bloomington, IL (US); Jonathan D. Maurer, Bloomington, IL (US); Nathan L. Tofte, Downs, IL (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/687,010

(22) Filed: Nov. 18, 2019

Related U.S. Application Data

(63) Continuation of application No. 15/836,668, filed on Dec. 8, 2017, now Pat. No. 10,515,445, which is a
(Continued)

(51) Int. Cl.
*G06T 7/60* (2017.01)
*G06T 7/00* (2017.01)
(Continued)

(52) U.S. Cl.
CPC .............. *G06T 7/0004* (2013.01); *G06K 9/52* (2013.01); *G06K 9/6215* (2013.01);
(Continued)

(58) Field of Classification Search
CPC .................... G06T 7/0004; G06T 7/60; G06T 2207/30181; G06T 2207/30108;
(Continued)

(56) References Cited

U.S. PATENT DOCUMENTS 8,689,490 B2  4/2014  Sumner
8,872,818 B2  10/2014  Freeman et al.
(Continued)

*Primary Examiner* — Sheela C Chawan
(74) *Attorney, Agent, or Firm* — Marshall, Gerstein & Borun LLP

(57) ABSTRACT

Systems and methods for assessing a physical structure are provided. Information indicative of an infrared image that includes a portion of the physical structure is received, and one or more indicators within the infrared image exceeding a heat threshold are determined. A plurality of characteristics of the one or more indicators are determined. One or more edges of the portion of the physical structure are detected, and an area associated with an intended use of one or more fasteners associated with the physical structure is determined according to the detected edges. An amount of the one or more indicators corresponding to the area is determined, and the one or more indicators are classified as fasteners according to the determined amount. Based on the classification of the one or more indicators, a condition of the physical structure is determined.

20 Claims, 8 Drawing Sheets

Related U.S. Application Data continuation of application No. 15/173,453, filed on Jun. 3, 2016, now Pat. No. 9,922,412.

(51) Int. Cl.
*G06Q 50/16* (2012.01)
*G06T 7/13* (2017.01)
*G06K 9/62* (2006.01)
*G06K 9/52* (2006.01)
*G06Q 50/08* (2012.01)

(52) U.S. Cl.
CPC ........... *G06K 9/6267* (2013.01); *G06Q 50/08* (2013.01); *G06Q 50/16* (2013.01); *G06T 7/13* (2017.01); *G06T 7/60* (2013.01); *G06T 2207/30108* (2013.01); *G06T 2207/30181* (2013.01)

(58) Field of Classification Search
CPC .......... G06Q 50/08; G06Q 50/16; G06K 9/52; G06K 9/6215; G06K 9/6267
USPC ....... 382/141, 165, 168, 171, 172, 190, 224, 382/278
See application file for complete search history.

(56) References Cited

U.S. PATENT DOCUMENTS

| | | |
|---|---|---|
| 9,505,494 B1 | 11/2016 | Marlow et al. |
| 9,536,148 B2 | 1/2017 | Gross |
| 9,613,538 B1 | 4/2017 | Poole et al. |
| 9,922,412 B1 | 3/2018 | Freeman et al. |
| 10,515,445 B1 * | 12/2019 | Freeman ............... G06T 7/0004 |

* cited by examiner

SYSTEM AND METHOD FOR ASSESSING A PHYSICAL STRUCTURE

CROSS-REFERENCE TO RELATED APPLICATIONS

The present application is a continuation of U.S. application Ser. No. 15/836,668, now U.S. Pat. No. 10,515,445, filed Dec. 8, 2017, entitled "System and Method for Assessing a Physical Structure," which is a continuation of U.S. application Ser. No. 15/173,453, now U.S. Pat. No. 9,922,412 filed Jun. 3, 2016, entitled "System and Method for Assessing a Physical Structure," each of which are hereby incorporated by reference for all purposes.

TECHNICAL FIELD

The present disclosure generally relates to a system and a method for assessing a physical structure and, more particularly, determining a condition of the physical structure using infrared imaging.

BACKGROUND

Determining and documenting the extent of damage to a structure can be risky for the person determining the damage. For example, in a situation where a structure has experienced roof damage, someone typically climbs onto the roof to evaluate the damage. Once on the roof, he or she may sketch the damaged area of the roof in order to document the damage. In the alternative, he or she might take a digital picture of the damaged area. Afterwards, the picture might be analyzed by someone to estimate the extent of damage to the structure. In either scenario, the person has exposed himself or herself to a risk of falling. Depending on various factors (e.g., size of the building, location, and weather conditions) the process may take a long time to complete. In the event that a geographical area is affected by a natural disaster, the extensive repair work required may be greatly delayed due to the time spent assessing the damage to each of a relatively large number of buildings.

SUMMARY

Example systems and methods for assessing a physical structure are herein described. In accordance with a first example aspect, a method for assessing a physical structure is disclosed. The method includes receiving, by one more computing devices, information indicative of an infrared image. The infrared image includes a portion of the physical structure. The method also includes determining, by the one or more computing devices, one or more indicators within the infrared image. The one or more indicators exceed a heat threshold. The method also includes determining, by the one or more computing devices, a plurality of characteristics of the one or more indicators. The method also includes receiving, by the one or more computing devices, information indicative of an image of the portion of the physical structure. The image corresponds to the infrared image. The method also includes determining, by the one more computing devices, locations of the one or more indicators. The method also includes analyzing, by the one or more computing devices, the image according to the locations of the one or more indicators to determine information indicative of (i) a fastener coupled to the physical structure or (ii) damage to the physical structure. The method also includes classifying, by the one or more computing devices, the one or more indicators according to the analysis. The method also includes determining, by the one or more computing devices, a condition of the physical structure based on the classification of the one or more indicators.

In accordance with a second example aspect, a system for assessing a physical structure is disclosed. The system includes a communication network, one or more computing devices communicatively coupled to the communication network, and a non-transitory computer-readable memory coupled to the one or more computing devices. The non-transitory computer-readable memory stores thereon instructions that, when executed by the one or more computing devices, cause the system to receive, via the communication network, information indicative of an infrared image. The infrared image includes a portion of the physical structure. The instructions also cause the system to determine one or more indicators within the infrared image. The one or more indicators exceed a heat threshold. The instructions also cause the system to determine a plurality of characteristics of the one or more indicators. The plurality of characteristics includes a size and a shape. The instructions also cause the system to receive information indicative of an image of the portion of the physical structure. The image corresponds to the infrared image. The instructions also cause the system to determine locations of the one or more indicators. The instructions also cause the system to analyze the image according to the locations of the one or more indicators to determine information indicative of (i) a fastener coupled to the physical structure or (ii) damage to the physical structure. The instructions also cause the system to classify the one or more indicators according to the analysis. The instructions also cause the system to determine a condition of the physical structure based on the classification of the one or more indicators.

In accordance with a third example aspect, a computer readable medium including non-transitory computer readable instructions stored thereon for assessing a physical structure, the instructions include receiving, by one or more computing devices, information indicative of an infrared image. The infrared image includes a portion of the physical structure. The instructions also include determining, by the one or more computing devices, one or more indicators within the infrared image. The one or more indicators exceed a heat threshold. The instructions also include determining, by the one or more computing devices, a plurality of characteristics of the one or more indicators. The instructions also include receiving, by the one or more computing devices, information indicative of an image of the portion of the physical structure. The image corresponds to the infrared image. The instructions also include determining, by the one more computing devices, locations of the one or more indicators. The instructions also include analyzing, by the one or more computing devices, the image according to the locations of the one or more indicators to determine information indicative of (i) a fastener coupled to the physical structure or (ii) damage to the physical structure. The instructions also include classifying, by the one or more computing devices, the one or more indicators according to the analysis. The instructions also include determining, by the one or more computing devices, a condition of the physical structure based on the classification of the one or more indicators.

In further accordance with any one or more of the foregoing first, second, or third example aspects, a method, system, or computer-readable medium may further include any one or more of the following forms.

In one form, classifying the one or more indicators according to the determined plurality of characteristics further comprises receiving, by the one or more computing devices, information indicative of an expected heat signature pattern corresponding to a plurality of fasteners, comparing, by the one or more computing devices, the plurality of characteristics to the expected heat signature pattern, determining, by the one or more computing devices, a correlation based on the comparison, and classifying, by the one or more computing devices, the one or more indicators according to the determined correlation.

In another form, the physical structure comprises a roof of a building.

In another form, the plurality of characteristics include at least one or more of a size, a shape, or a nearest-neighbor distance.

In another form, providing, by the one or more computing devices, for display, the locations of the one or more indicators overlaid onto the image.

In another form, determining, by the one or more computing devices, that the portion of the physical structure is in need of repair based on the determined condition, and providing an output signal comprising information indicative of the repair.

In another form, classifying the one or more indicators according to the determined plurality of characteristics further comprises instructions that cause the system to receive information indicative of an expected heat signature pattern corresponding to a plurality of fasteners, compare the plurality of characteristics to the expected heat signature pattern, determine a correlation based on the comparison, and classify the one or more indicators according to the determined correlation.

In another form, wherein classifying the one or more indicators further comprises instructions that cause the system to receive information indicative of an expected size and an expected shape corresponding to a heat signature of a fastener, compare the plurality of characteristics of the one or more indicators to the information indicative of the expected size and the expected shape, based on the comparison, determine a correlation between the plurality of characteristics to the information indicative of the expected size and the expected shape, and classify the one or more indicators as hardware elements according to the determined correlation.

In another form, wherein classifying the one or more indicators further comprises instructions that cause the system to receive information indicative of an expected size and an expected shape corresponding to a heat signature of a fastener, compare the plurality of characteristics of the one or more indicators to the information indicative of the expected size and the expected shape associated with the fastener, based on the comparison, determine one or more differences between the plurality of characteristics and the information indicative of the expected size and the expected shape, and classify the one or more indicators as damage to the physical structure according to the determined one or more differences.

In another form, wherein classifying the one or more indicators further comprises instructions that cause the system to detect one or more edges of the portion of the physical structure, determine an area according to the detected one or more edges, wherein the area is associated with an intended use of one or more fasteners with the physical structure, determine an amount of the one or more indicators corresponding to the area, and classify the one or more indicators as fasteners according to the determined amount.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, where possible, the following description refers to the reference numerals included in the following figures, in which features depicted in multiple figures are designated with consistent reference numerals.

DETAILED DESCRIPTION

In some embodiments of the present invention, the time and costs associated with a visual inspection of a physical structure may be reduced by capturing image and/or video data of the physical structure. In one example embodiment, the captured data may be captured by an individual with a handheld camera. In another example embodiment, the captured data may be captured by an unmanned aerial vehicle that is retrofitted with an imaging device capable of capturing an image, recording a video (i.e., a time sequence of images), or both. In either example, the captured data may be transmitted to a remote server for further analysis and processing.

In some embodiments, an analysis of the image(s) may be performed by the remote server. The analysis may include an analysis of an infrared image in order to detect indicators within the infrared image that exceed a heat threshold. In one such embodiment, the infrared image may be analyzed to determine locations within the image that are indicative of damage. The analysis may be performed by the remote server using image recognition software. The image recognition software may be configured to determine the locations of damage (e.g., dents, holes, etc.) based on the varying levels of emissivity detected within the infrared image. For example, the infrared image of the physical structure may show a roof of a building that has been damaged. The damage to the roof may be detected and/or measured by determining characteristics associated with one or more locations of the roof that exceed a heat threshold.

In one example scenario, a segment that comprises a shingle of a building structure may have formed dents and/or holes that need to be repaired. The dents and/or holes may differ (e.g., color and intensity within the infrared image) from the undamaged areas of the shingle. An analysis of the infrared image may determine characteristics (e.g., size, shape, nearest-neighbor distance) of determined locations exceeding the heat threshold and compare the determined characteristics to one or more expected heat signatures (e.g., the emissivity of nails and/or screws) associated with the shingle. Thereafter, the determined locations may be classified as damage to the shingle based on determined differences resulting from the comparison. Further, a condition of the physical structure may be determined based on the classification.

Figure 1:
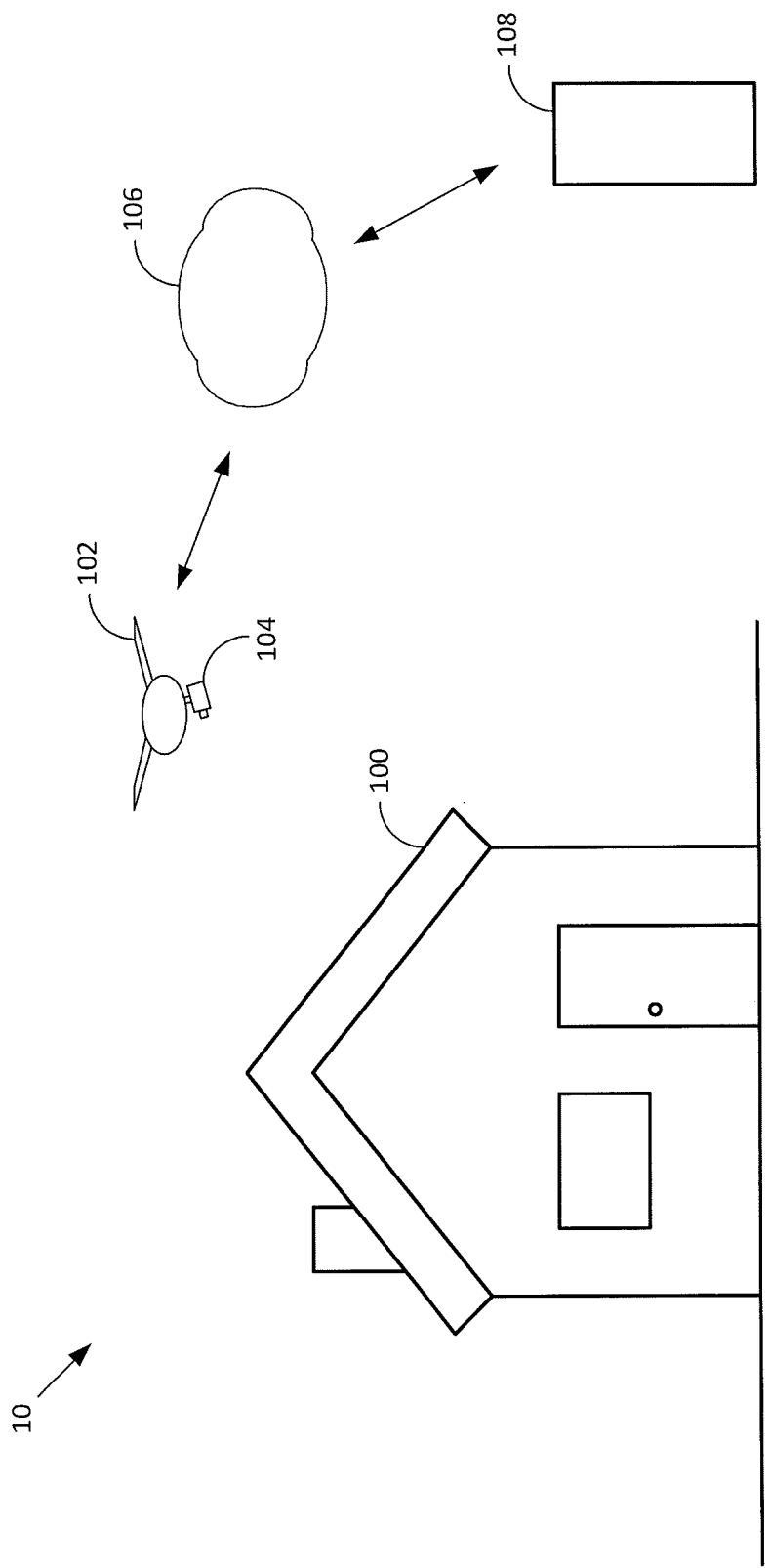
FIG. 1 is a diagram of an example environment in which a physical structure may be assessed, according to an embodiment of the present disclosure.

Referring now to the figures, FIG. 1 is a diagram of an example environment 10 in which the structure of a building 100 may be assessed. In addition to the building 100, the environment 10 includes an unmanned aerial vehicle (UAV) 102 carrying an imaging device 104. The imaging device 104 may be communicatively coupled with the UAV 102. The UAV 102 or the imaging device 104 or both may be capable of transmitting a wireless signal via a communication network 106 to a remote server 108.

The building 100 may be a residential home. In another example, the building 100 may be a commercial building. In this example, the commercial building may include segments similar to those of a residential home (e.g., a roof, windows, etc.), as well as segments that are different than the residential home (e.g., a revolving door). In other embodiments, the building 100 may be industrial, agricultural, educational, or of any other nature.

The UAV 102 may be configured to be remotely controlled and configured with the capability to fly. In one instance, the UAV 102 may help to reach certain viewpoints of the building 100 that are not possible for an individual located on the ground. In one scenario, the UAV 102 may be configured to communicate with the remote server 108 via the communication network 106. The remote server 108 may be configured to receive and transmit data to the UAV 102. For instance, the UAV 102 may transmit GPS data, image data, and video data associated with the building 100 to the remote server 108 for storage.

The use of a UAV, such as UAV 102, when capturing data of the building structure may be an effective tool for capturing data from remote locations. The captured data from the UAV may also serve to reduce the likelihood of errors that may occur from an individual visiting a site and maintaining a log associated with a visual inspection.

The imaging device 104 may include any number of photosensors, photodiodes, photomultipliers, or image sensor types, including charge-coupled-devices (CCD), complementary metal-oxide semiconductor (CMOS) sensors, or some combination therefore. In some instances, the imaging device may be a single-camera setup that is capable of capturing video, photo, infrared, etc. As used herein, the term "image" or "imaging" refers not only to camera images, but also to images obtained by other types of sensors. Thus, for example, the imaging device 104 may include a different type of sensor, such as a radar or LiDAR sensor.

The imaging device 104 may be used to capture one or more exterior sides of the building 100. After the one or more sides of the building 100 have been captured, the captured data may be transmitted to a remote server for further processing. In one example embodiment, one or more components associated with the imaging device 104 may transmit a live view of the building 100 to an individual. In this example, the live view could be used to control the flight of the UAV 102 from a remote location. Remotely controlling the UAV 102 would allow an individual to situate the UAV 102 at a predetermined position (e.g., facing south when capturing an image of the roof) in order to obtain an image that corresponds with a previous image. In another example embodiment, the UAV 102 may be provided with instructions that the UAV 102 automatically carries out, without manual control, in order to assist with the analysis of one or more images.

Figure 2:
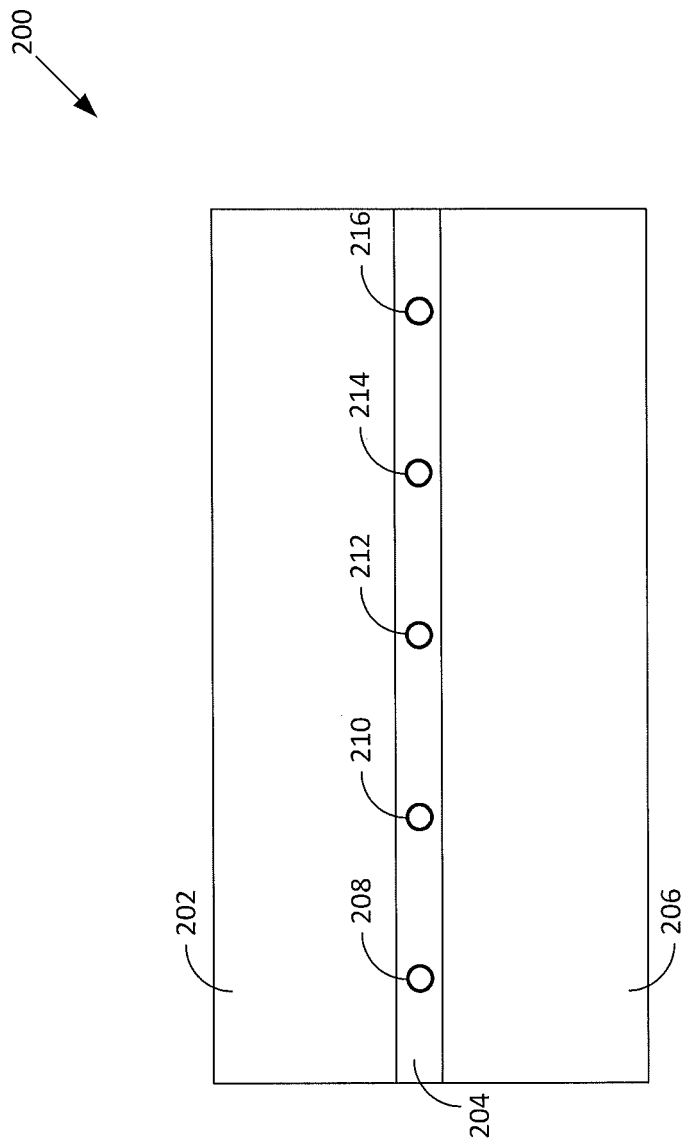
FIG. 2 depicts an example image of a portion of the physical structure according to an embodiment of the present disclosure.

FIG. 2 illustrates an example image 200 of a shingle of the building 100 of FIG. 1. The image 200 comprises multiple regions, including upper region 202, nail strip region 204 and lower region 206. As shown in FIG. 2, nail strip region 204 includes a plurality of fasteners 208, 210, 212, 214, and 216. In one example, the plurality of fasteners 208, 210, 212, 214, and 216 may be used to couple the shingle to the roof of building 100.

In one example, an analysis of the image 200 may be received by one or more processors (e.g., of the remote server 100 from the UAV 102 of FIG. 1), and the analysis may pertain to one or more regions of the image 200, such as region 202 and region 206. In another example, the analysis may pertain to region 204 to detect damage associated with the plurality of fasteners.

By way of example, the analysis may be performed by software that is designed to analyze and compare one or more images of the building 100. The software may be stored in a persistent memory of a server (e.g., the remote server 108 of FIG. 1), for example, and executed by one or more processors of the server. In addition to the image(s), the software may receive additional data, such as weather related information, to assist in determining damage with one or more segments of the building 100. If a given building has been exposed to a season that produced an above average amount of hail, for example, then multiple segments such as the shingles of the roof may be more susceptible to damage.

The software may also include one or more modules that are configured to receive data pertaining to a list of building materials associated with the building. For instance, the list of building materials may include the types of various building segments, such as doors, windows, seals, siding, etc. As a more specific example, one or more modules of the software may take manufacturer information into consideration when determining if a replacement is needed for a particular segment. In one scenario, for example, the manufacturer information may be used to determine the distance of the nail strip region 204 from the bottom region 206. In this scenario, the software module(s) may be configured to compare the number of indicators corresponding to fasteners detected within the nail strip region 204 with manufacturer recommendations in order to determine whether the shingle is installed properly.

Figure 3:
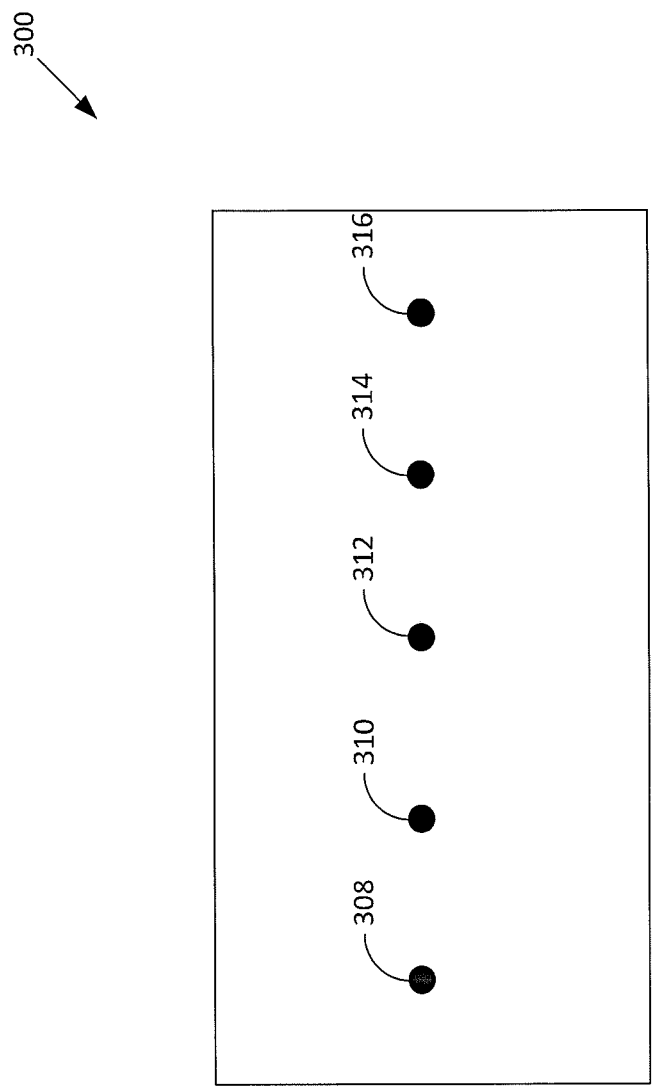
FIG. 3 depicts another example image of a portion of the physical structure according to an embodiment of the present disclosure.

FIG. 3 illustrates an example infrared image 300 of the shingle of FIG. 2. As shown in FIG. 3, the infrared image 300 includes indicators 308, 310, 312, 314, and 316. Indicators 308, 310, 312, 314, and 316 correspond to the plurality of fasteners 208, 210, 212, 214, and 216 of FIG. 2, respectively. FIG. 3 illustrates an example infrared image with no damage associated with the shingle.

In one implementation, one or more software modules may be configured to analyze the infrared image 300 to determine one or more indicators within the infrared image that exceed a heat threshold. In this example, the indicators 308, 310, 312, 314, and 316 are indicative of a heat signature associated with the plurality of fasteners 208, 210, 212, 214, and 216 of FIG. 2, respectively. In one example, the one or more software modules may be configured to determine a plurality of characteristics of the indicators 308, 310, 312, 314, and 316. For instance, the one or more software modules may determine the size and the shape of the indicators 308, 310, 312, 314, and 316 based on an analysis of the image 300. Based on the determined plurality of characteristics, the one or more software modules may be configured to classify the one or more indicators. In this instance, the indicators 308, 310, 312, 314, and 316 may be classified as "Good" (e.g., undamaged and/or no need for replacement) based on the determined size and shape correlating to an expected size and shape. Based on the classification(s), the one or more software modules may be configured to provide a condition or grade associated with the analysis. The condition or grade may include information indicative of whether there is a need to repair the building structure.

Figure 4:
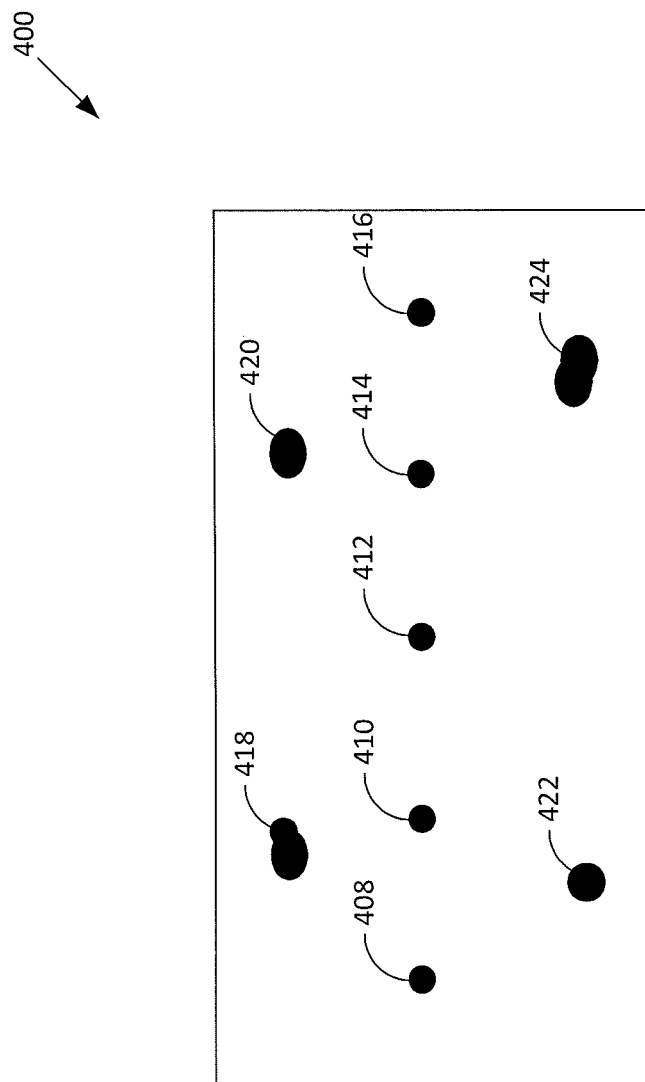
FIG. 4 depicts another example image of a portion of the physical structure according to an embodiment of the present disclosure.

FIG. 4 illustrates an example infrared image 400 of the shingle of FIG. 2. As shown in FIG. 4, the infrared image 400 includes indicators 408, 410, 412, 414, and 416. Indicators 408, 410, 412, 414, and 416 correspond to the plurality of fasteners 208, 210, 212, 214, and 216 of FIG. 2, respectively. The infrared image 400 also includes indicators 418, 420, 422, and 424. FIG. 4 illustrates an example infrared image including damage associated with the shingle.

As described above, one or more software modules may be configured to analyze the infrared image 400 to determine one or more indicators within the infrared image 400 that exceed a heat threshold. In this example, the indicators 408, 410, 412, 414, and 416 are indicative of a heat signature associated with the plurality of fasteners 208, 210, 212, 214, and 216 of FIG. 2, respectively. Further, the one or more software modules may be configured to also determine indicators 418, 420, 422, and 424 within the infrared image 400. The one or more software modules may be configured to determine a plurality of characteristics of the indicators 418, 420, 422, and 424. For example, the size and the shape of the indicators 418, 420, 422, and 424 may be determined by the one or more software modules. In one scenario, the determined size and the determined shape may be compared to an expected size and an expected shape of a heat signature corresponding to a fastener. Based on the comparison, the one or more software modules may determine that the indicators 418, 420, 422, and 424 correspond to damage. Further, the one or more software modules may classify the indicators 418, 420, 422, and 424 as damage to the shingle. In this scenario, the one or more software modules may determine the condition of the shingle to be damaged based on the classification(s).

Figure 5:
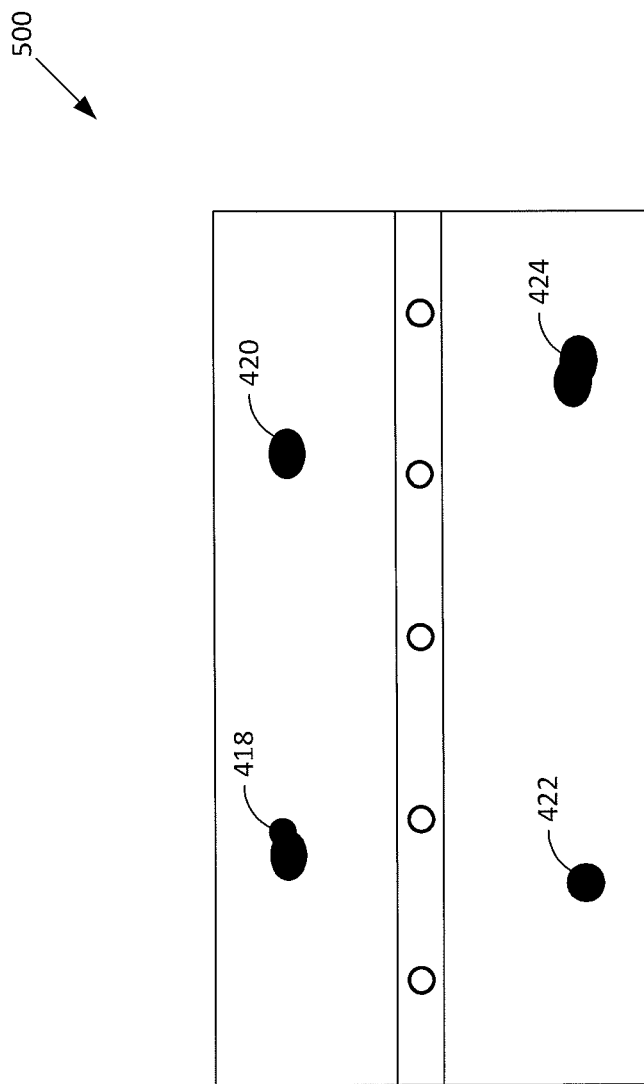
FIG. 5 depicts another example image of a portion of the physical structure according to an embodiment of the present disclosure.

FIG. 5 illustrates an example image 500 of the shingle of FIG. 2 and the indicators 418, 420, 422, and 424 of FIG. 4. Referring to FIG. 5, the image 500 includes indicators 418, 420, 422, and 424 overlaid onto the image 200 of FIG. 2.

In one implementation as described above, one or more software modules may determine that indicators 418, 420, 422, and 424 are associated with damage to the shingle based on the determined classifications. In one scenario, the one or more software modules may determine the locations of the indicators 418, 420, 422, and 424 such that the indicators 418, 420, 422, and 424 are overlaid onto the corresponding portions of the image 200.

In one example, the indicators 418, 420, 422, and 424 may be displayed in a different manner than the undamaged areas of the shingle in order to provide a quick way to view the damaged areas. For instance, if the analysis determined that the damage is indicative of dents to the shingle, then the indicators 418, 420, 422, and 424 may be displayed with the color yellow. In another instance, if the analysis determined that the damage is indicative of holes to the shingle, then the indicators 418, 420, 422, and 424 may be displayed with the color red. Various colors may be used to distinguish the results of the classifications.

In one scenario, an individual may view the one or more indicators overlaid onto the image on a display device, such as a laptop computer or any other suitable electronic device. In this scenario, additional information associated with the one or more indicators may also be provided for display. For example, if a portion of the roof has an indicator that serves to indicate that the portion of the roof needs to be replaced, then additional information such as one or more recommendations for replacement materials may be provided for display as well.

Figure 6:
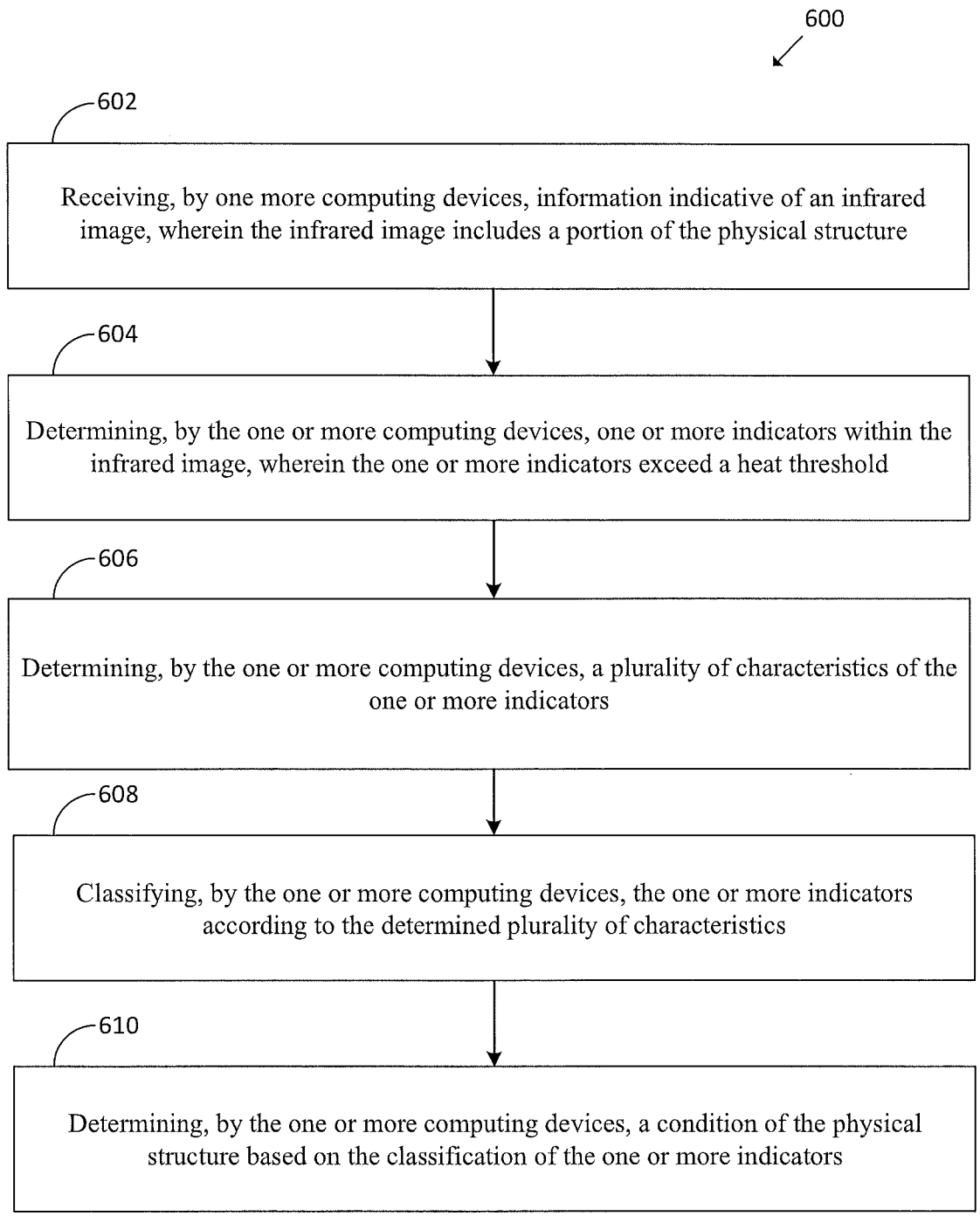
FIG. 6 depicts an example method for assessing a physical structure according to an embodiment of the present disclosure.

FIG. 6 is a flow diagram of an example method 600 for assessing a physical structure in accordance with at least some embodiments described herein. The method 600 may include one or more operations, functions, or actions as illustrated by blocks 602-610. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 600, the flowchart shows the functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 6 may represent circuitry that is wired to perform the specific logical functions in the process. Illustrative methods, such as method 600, may be carried out in whole or in part by a component or components in the cloud and/or system. However, it should be understood that example methods, such as method 600, may be carried out by other entities or combinations of entities (i.e., by other computing devices and/or combinations of computing devices), without departing from the scope of the invention.

For example, functions of the method 600 may be fully performed by a computing device (or components of a computing device such as one or more processors), or may be distributed across multiple components of the computing device, across multiple computing devices, and/or across a server.

The method 600 includes receiving, by one more computing devices, information indicative of an infrared image, wherein the infrared image includes a portion of the physical structure (block 602). In one example, the infrared image may be obtained through the use of a UAV (e.g., UAV 102 of FIG. 1). Other examples are possible as well, such as a radio controlled device or a device that rolls, drives, crawls, climbs, etc. As another example, an individual may use a portable imaging device (i.e., a handheld camera) to capture infrared images of the physical structure.

The method 600 also includes determining, by the one or more computing devices, one or more indicators within the infrared image, wherein the one or more indicators exceed a heat threshold (block 604). The heat threshold may be based on user defined variables that are specific to materials of a roof and/or a given geographic region. For instance, a particular geographic region may be more likely to be affected by the presence of the sun, and therefore the heat threshold may be adjusted to be able to detect differences in emissivity associated with shingles of a roof.

The method 600 also includes determining, by the one or more computing devices, a plurality of characteristics of the one or more indicators (block 606). In one example, the plurality of characteristics include at least one or more of a size, a shape, or a nearest-neighbor distance. The plurality of characteristics may be determined according to the material of the physical structure. For instance, a vehicle roof comprising a carbon fibre composite may reflect damage in an infrared image in a different way than a vehicle roof comprising aluminum.

The method 600 also includes classifying, by the one or more computing devices, the one or more indicators according to the determined plurality of characteristics (block 608). In one example, the classifications may include a number of categories to differentiate indicators corresponding to damage (e.g., dents, holes, etc.) and indicators corresponding to hardware elements (e.g., nails, screws, etc.). In another example, an additional category may be used to reduce the number of false positives. In this example, the indicators associated with this additional category may be provided for further review by an individual.

In one example scenario, a segment that comprises a shingle of a building structure may have formed dents and/or holes. The dents and/or holes may differ (e.g., color, size, shape, etc.) from the undamaged areas of the shingle. The characteristics of the dents and/or holes may be used to classify the dents and/or holes as damage to the shingle.

In one instance, the classification may also include calculating the percentage of pixels associated with damage (e.g., dents and/or holes) within the infrared image. The calculation may include determining a percentage of pixels associated with damage, out of all the pixels corresponding to the entire shingle, that differ from the average pixel value (with respect to color value, intensity value, etc.) by some threshold amount.

The method 600 also includes determining, by the one or more computing devices, a condition of the physical structure based on the classification of the one or more indicators (block 610). In one example, the one or more computing devices may determine the condition of the physical structure to be "Good" based on no indicators being classified as damage. In another example, the one or more computing devices may determine the condition of the physical structure to be "Poor" based on a high number of indicators being classified as damage. By way of example, an individual may define one or more thresholds corresponding to the one or more classifications used to determine the condition of the physical structure.

While not shown in FIG. 6, the method 600 may also include receiving, by the one or more computing devices, information indicative of an expected heat signature pattern corresponding to a plurality of fasteners. The method 600 may also include comparing, by the one or more computing devices, the plurality of characteristics to the expected heat signature pattern. The method 600 may also include determining, by the one or more computing devices, a correlation based on the comparison. Further, the method 600 may also include classifying, by the one or more computing devices, the one or more indicators according to the determined correlation.

In another example, the method 600 may also include receiving information indicative of an image of the portion of the physical structure, wherein the image corresponds to the infrared image. The method 600 may also include determining locations of the one or more indicators. The method 600 may also include analyzing the image according to the locations of the one or more indicators to determine information indicative of (i) a fastener coupled to the physical structure or (ii) damage to the physical structure. Further, the method 600 may also include classifying the one or more indicators according to the analysis.

In another example, the method 600 may also include receiving information indicative of an expected size and an expected shape corresponding to a heat signature of a fastener. The method 600 may also include comparing the plurality of characteristics of the one or more indicators to the information indicative of the expected size and the expected shape. Based on the comparison, the method 600 may also include determining a correlation between the plurality of characteristics to the information indicative of the expected size and the expected shape. Further, the method 600 may also include classifying the one or more indicators as hardware elements according to the determined correlation.

In another example, the method 600 may also include receiving information indicative of an expected size and an expected shape corresponding to a heat signature of a fastener. The method 600 may also include comparing the plurality of characteristics of the one or more indicators to the information indicative of the expected size and the expected shape associated with the fastener. Based on the comparison, the method 600 may also include determining one or more differences between the plurality of characteristics and the information indicative of the expected size and the expected shape. Further, the method 600 may also include classifying the one or more indicators as damage to the physical structure according to the determined one or more differences.

In another example, the method 600 may also include detecting one or more edges of the portion of the physical structure. The method 600 may also include determining an area according to the detected one or more edges, wherein the area is associated with an intended use of one or more fasteners with the physical structure. The method 600 may also include determining an amount of the one or more indicators corresponding to the area. Further, the method 600 may also include classifying the one or more indicators as fasteners according to the determined amount.

In another example, the method 600 may also include providing an output signal (e.g., a report, etc.) comprising the information indicative of the portion of the physical structure that needs repair based on the determined condition. The output signal may include additional information pertaining to the one or more segments (e.g., shingles) as described above with respect to recommendations for replacement materials. In another example, a user interface may be configured to provide for display the locations of the indicators overlaid on the image (e.g., image 500 of FIG. 5).

Further, the individual may choose to display only the indicators that are associated with a classification indicating a need for immediate replacement.

Figure 7:
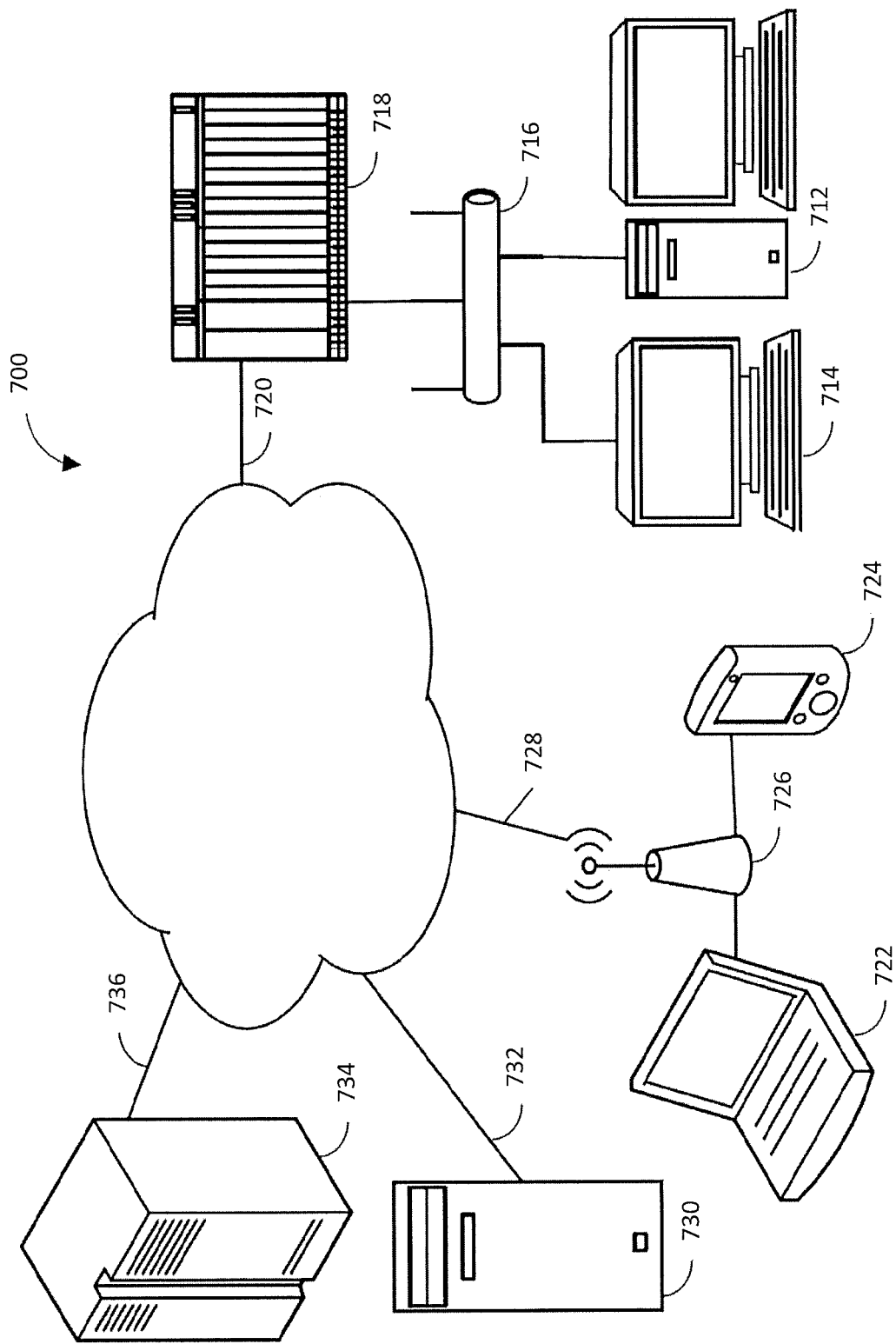
FIG. 7 is a block diagram of a network and computer hardware that may be utilized in accordance with the described embodiments.

FIG. 7 illustrates an exemplary block diagram of a network 700 and computer hardware that may be utilized in accordance with the described embodiments. The network 700 may be the Internet, a virtual private network (VPN), or any other network or combination of networks that allows one or more computers, communication devices, databases, etc., to be communicatively connected to each other. The network 700 may be connected to a personal computer 712 and a computer terminal 714 via an Ethernet 716 and a router 718, and via a landline 720. The Ethernet 716 may be a subnet of a larger Internet Protocol network. Other networked resources, such as projectors or printers (not depicted), may also be supported via the Ethernet 716 or another data network. Additionally, the network 700 may be wirelessly connected to a laptop computer 722 and a personal data assistant 724 via a wireless communication station 726 and a wireless link 728. Similarly, a server 730 may be connected to the network 700 using a communication link 732 and a mainframe 734 may be connected to the network 700 using another communication link 736. The network 700 may be useful for supporting peer-to-peer network traffic.

In one implementation, an infrared image of the physical structure may be received via the communication link 732 at the server 730. The server 730 may also be configured to determine one or more indicators within the infrared image that exceed a heat threshold. Further, the server 730 may be configured to determine a plurality of characteristics of the one or more indicators. The plurality of characteristics may include one or more of a size, a shape, and a nearest-neighbor distance. In this embodiment, the server may be configured to classify the one or more indicators according to the determined plurality of characteristics. The server 730 may also be configured to determine a condition of the physical structure based on the classification of the one or more indicators. Further, the server 730 may configured to provide a signal comprising information indicative of the determined condition. The signal may be received via wireless link 728 and displayed at the laptop 722 or the personal data assistant 724. In other implementations, the operations may be done by different devices in FIG. 7, and/or FIG. 7 may include more, fewer or different devices than are shown.

Figure 8:
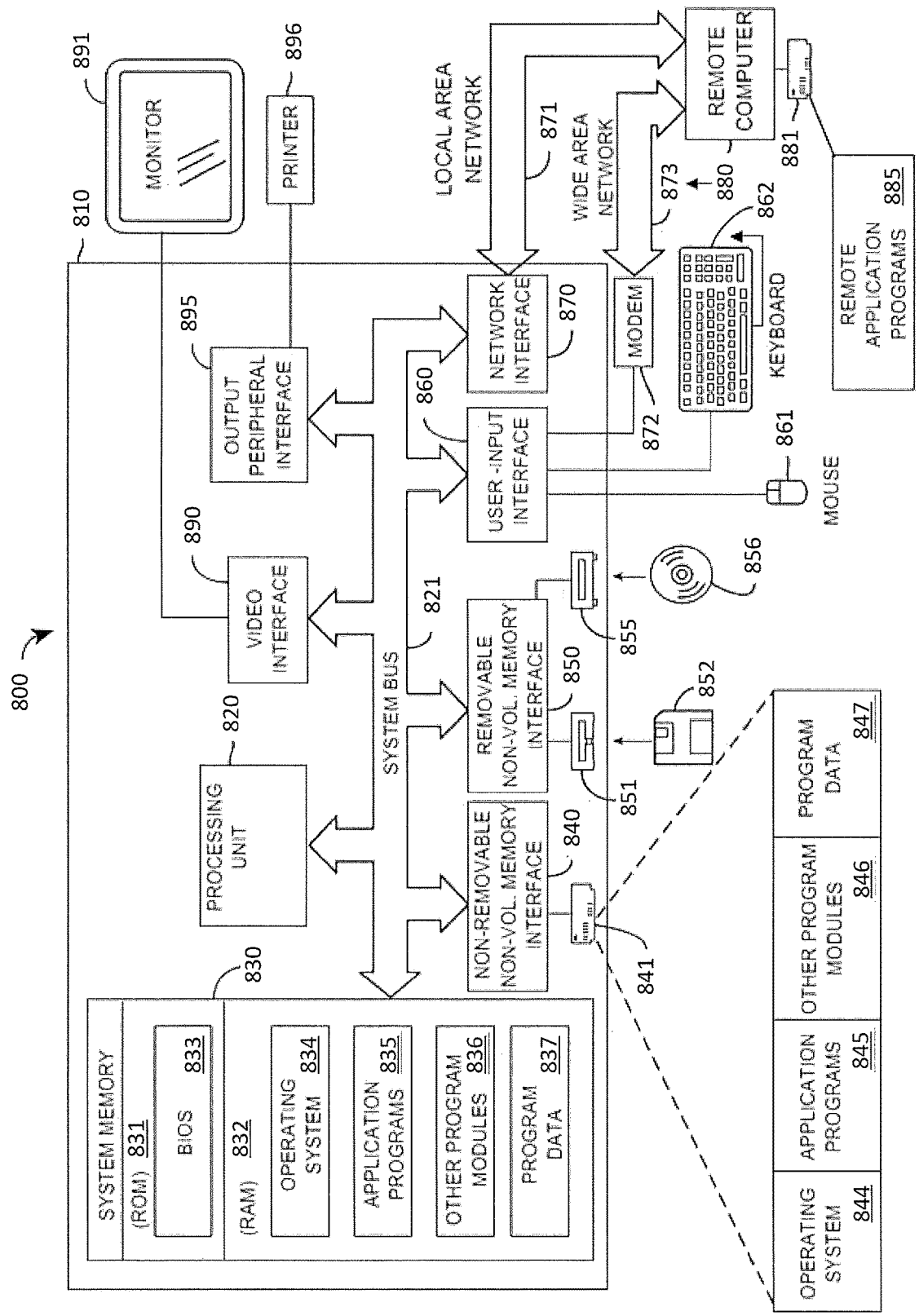
FIG. 8 is a block diagram of an example computer system in which the described embodiments may be implemented.

FIG. 8 is a block diagram of an example system 800 that may operate in accordance with the described embodiments. The system 800 of FIG. 8 includes a computing device in the form of a computer 810. Components of the computer 810 may include, and are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 810 typically includes a variety of computer readable media. Computer readable media can be any available media that can be accessed by computer 810 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules or routines, e.g., analyzing, calculating, indicating, etc., that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and cursor control device 861, commonly referred to as a mouse, trackball or touch pad. A screen 891 or other type of display device is also connected to the system bus 821 via an interface, such as a graphics controller 890. In addition to the screen 891, computers may also include other peripheral output devices such as printer 896, which may be connected through an output peripheral interface 895.

The computer 810 may operate in a networked environment using logical connections to one or more remote computers, such as a remote computer 880. The remote computer 880 may transmit and receive data from the UAV 102 of FIG. 1. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the input interface 860, or other appropriate mechanism. In a networked environment, program modules depicted relative to the computer 810, or portions thereof, may be stored in the remote memory storage device 881. By way of example, and not limitation, FIG. 8 illustrates remote application programs 885 as residing on memory device 881.

The communications connections 870, 872 allow the device to communicate with other devices. The communications connections 870, 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

The embodiments for the methods for assessing a physical structure as described above may be implemented in part or in their entirety using one or more computer systems such as the computer system 800 illustrated in FIG. 8. The information indicative of an infrared image, the one or more indicators, the plurality of characteristics, classification of the one or more indicators, and the determined condition of the physical structure may be received by a computer such as the computer 810, for example. The information indicative of an infrared image, the one or more indicators, the plurality of characteristics, classification of the one or more indicators, and the determined condition of the physical structure may be received over a communication medium such as local area network 871 or wide area network 873, via network interface 870 or user-input interface 860, for example. As another example, the information indicative of an infrared image, the one or more indicators, the plurality of characteristics, classification of the one or more indicators, and the determined condition of the physical structure may be received from a remote source such as the remote computer 880 where the data is initially stored on memory device such as the memory storage device 881. As another example, the information indicative of an infrared image, the one or more indicators, the plurality of characteristics, classification of the one or more indicators, and the determined condition of the physical structure may be received from a removable memory source such as the nonvolatile magnetic disk 852 or the nonvolatile optical disk 856.

Some or all of the analyzing or determining involved in the one or more indicators, the plurality of characteristics, classification of the one or more indicators, and the condition of the physical structure may be performed by a computer such as the computer 810, and more specifically may be performed by one or more processors, such as the processing unit 820, for example. In some embodiments, some calculations may be performed by a first computer such as the computer 810 while other calculations may be performed by one or more other computers such as the remote computer 880. The analyses and/or calculations may be performed according to instructions that are part of a program such as the application programs 835, the application programs 845 and/or the remote application programs 885, for example. For example, the method 600 may be performed by the processing unit 820 when executing instructions stored in RAM 832.

In some embodiments, determining the one or more indicators, determining the plurality of characteristics, classifying the one or more indicators, and determining the condition of the physical structure may include sending data over a network such as the local area network 871 or the wide area network 873 to another computer, such as the remote computer 881. In other embodiments, providing for display the locations of the one or more indicators overlaid onto an image may include sending data over a video interface such as the video interface 890 to display information for assessing the physical structure on an output device such as the screen 891, for example.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of systems and methods for assessing a physical structure. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method for assessing a physical structure, comprising:
    receiving, by one or more computing devices, information indicative of an infrared image, wherein the infrared image includes a portion of the physical structure;
    determining, by the one or more computing devices, one or more indicators within the infrared image, wherein the one or more indicators exceed a heat threshold;
    determining, by the one or more computing devices, a plurality of characteristics of the one or more indicators;
    detecting, by the one or more computing devices, one or more edges of the portion of the physical structure;
    determining, by the one or more computing devices, an area according to the detected one or more edges, wherein the area is associated with an intended use of one or more fasteners with the physical structure;
    determining, by the one or more computing devices, an amount of the one or more indicators corresponding to the area;
    classifying, by the one or more computing devices, the one or more indicators as fasteners according to the determined amount; and
    determining, by the one or more computing devices, a condition of the physical structure based on the classification of the one or more indicators.

2. The method of claim 1, wherein classifying the one or more indicators further comprises:
    receiving, by the one or more computing devices, information indicative of an expected heat signature pattern corresponding to a plurality of fasteners;
    comparing, by the one or more computing devices, the plurality of characteristics to the expected heat signature pattern;
    determining, by the one or more computing devices, a correlation based on the comparison; and
    classifying, by the one or more computing devices, the one or more indicators according to the determined correlation.

3. The method of claim 1, wherein classifying the one or more indicators further comprises:
    receiving, by the one or more computing devices, information indicative of an expected size and an expected shape corresponding to a heat signature of the one or more fastener;
    comparing, by the one or more computing devices, the plurality of characteristics of the one or more indicators to the information indicative of the expected size and the expected shape;
    determining, by the one or more computing devices, based on the comparison, a correlation between the plurality of characteristics to the information indicative of the expected size and the expected shape; and
    classifying, by the one or more computing devices, the one or more indicators as hardware elements according to the determined correlation.

4. The method of claim 1, wherein classifying the one or more indicators further comprises:
    receiving, by the one or more computing devices, information indicative of an expected size and an expected shape corresponding to a heat signature of the one or more fastener;
    comparing, by the one or more computing devices, the plurality of characteristics of the one or more indicators to the information indicative of the expected size and the expected shape associated with the one or more fastener;
    determining, by the one or more computing devices, based on the comparison, one or more differences between the plurality of characteristics and the information indicative of the expected size and the expected shape; and
    classifying, by the one or more computing devices, the one or more indicators as damage to the physical structure according to the determined one or more differences.

5. The method of claim 1, wherein the physical structure comprises a roof of a building.

6. The method of claim 1, wherein the plurality of characteristics include at least one or more of a size, a shape, or a nearest-neighbor distance.

7. The method of claim 1, further comprising:
    providing, by the one or more computing devices, for display, locations of the one or more indicators overlaid onto the infrared image.

8. The method of claim 1, further comprising:
    determining, by the one or more computing devices, that the portion of the physical structure is in need of repair based on the determined condition; and
    providing, by the one or more computing devices, an output signal comprising information indicative of the need of repair.

9. The method of claim 1, wherein classifying the one or more indicators further comprises:
    receiving, by the one or more computing devices, information indicative of an image of the portion of the physical structure, wherein the image corresponds to the infrared image;
    determining, by the one or more computing devices, locations of the one or more indicators:
    analyzing, by the one or more computing devices, the image according to the locations of the one or more indicators to determine information indicative of (i) the one or more fastener coupled to the physical structure or (ii) damage to the physical structure; and
    classifying, by the one or more computing devices, the one or more indicators according to the analysis.

10. A system for assessing a physical structure, comprising:
    a communication network;
    one or more computing devices communicatively coupled to the communication network;
    and a non-transitory computer-readable memory coupled to the one or more computing devices and storing thereon instructions that, when executed by the one or more computing devices, cause the system to:
        receive, via the communication network, information indicative of an infrared image, wherein the infrared image includes a portion of the physical structure;
        determine one or more indicators within the infrared image, wherein the one or more indicators exceed a heat threshold;
        determine a plurality of characteristics of the one or more indicators, wherein the plurality of characteristics includes a size and a shape;
        detect one or more edges of the portion of the physical structure;
        determine an area according to the detected one or more edges, wherein the area is associated with an intended use of one or more fasteners with the physical structure;
        determine an amount of the one or more indicators corresponding to the area;
        classify the one or more indicators as fasteners according to the determined amount; and
        determine a condition of the physical structure based on the classification of the one or more indicators.

11. The system of claim 10, wherein the instructions that, when executed by the one or more computing devices, cause the system to classify the one or more indicators, further cause the system to:
    receive information indicative of an expected heat signature pattern corresponding to the one or more fasteners;
    compare the plurality of characteristics to the expected heat signature pattern;
    determine a correlation based on the comparison; and
    classify the one or more indicators according to the determined correlation.

12. The system of claim 10, wherein the physical structure comprises a roof of a building.

13. The system of claim 10, wherein the instructions, that, when executed by the one or more computing devices, cause the system to classify the one or more indicators, further cause the system to:
    receive information indicative of an expected size and an expected shape corresponding to a heat signature of the one or more fastener;
    compare the plurality of characteristics of the one or more indicators to the information indicative of the expected size and the expected shape;
    based on the comparison, determine a correlation between the plurality of characteristics to the information indicative of the expected size and the expected shape; and
    classify the one or more indicators as hardware elements according to the determined correlation.

14. The system of claim 10, wherein the instructions, that, when executed by the one or more computing devices, cause the system to classify the one or more indicators, further cause the system to:
    receive information indicative of an image of the portion of the physical structure, wherein the image corresponds to the infrared image;
    determine locations of the one or more indicators;
    analyze the image according to the locations of the one or more indicators to determine information indicative of (i) the one or more fastener coupled to the physical structure or (ii) damage to the physical structure; and
    classify the one or more indicators according to the analysis.

15. The system of claim 10, wherein the instructions, when executed by the one or more computing devices, further cause the system to:
    determine that the portion of the physical structure is in need of repair based on the determined condition; and
    provide an output signal comprising information indicative of the need of repair.

16. A computer readable medium including non-transitory computer readable instructions stored thereon for assessing a physical structure, the instructions comprising instructions for:
    receiving, by one or more computing devices, information indicative of an infrared image, wherein the infrared image includes a portion of the physical structure;
    determining, by the one or more computing devices, one or more indicators within the infrared image, wherein the one or more indicators exceed a heat threshold;
    determining, by the one or more computing devices, a plurality of characteristics of the one or more indicators, wherein the plurality of characteristics includes a size and a shape;
    determining, by the one or more computing devices, an area according to the detected one or more edges, wherein the area is associated with an intended use of one or more fasteners with the physical structure;
    determining, by the one or more computing devices, an amount of the one or more indicators corresponding to the area;
    classifying, by the one or more computing devices, the one or more indicators as fasteners according to the determined amount; and
    determining, by the one or more computing devices, a condition of the physical structure based on the classification of the one or more indicators.

17. The computer readable medium of claim 16, wherein classifying the one or more indicators further comprises:

receiving, by the one or more computing devices, information indicative of an expected size and an expected shape corresponding to a heat signature of the one or more fastener;

comparing, by the one or more computing devices, the plurality of characteristics of the one or more indicators to the information indicative of the expected size and the expected shape;

based on the comparison, determining, by the one or more computing devices, a correlation between the plurality of characteristics to the information indicative of the expected size and the expected shape; and classifying, by the one or more computing devices, the one or more indicators as hardware elements according to the determined correlation.

18. The computer readable medium of claim 16, wherein classifying the one or more indicators further comprises:

receiving, by the one or more computing devices, information indicative of an image of the portion of the physical structure, wherein the image corresponds to the infrared image;

determining, by the one or more computing devices, locations of the one or more indicators;

analyzing, by the one or more computing devices, the image according to the locations of the one or more indicators to determine information indicative of (i) the one or more fastener coupled to the physical structure or (ii) damage to the physical structure; and classifying, by the one or more computing devices, the one or more indicators according to the analysis.

19. The computer readable medium of claim 16, wherein the physical structure comprises a roof of a building.

20. The computer readable medium of claim 16, wherein the instructions further include instructions for:

determining, by the one or more computing devices, that the portion of the physical structure is in need of repair based on the determined condition; and providing, by the one or more computing devices, an output signal comprising information indicative of the need of repair.

\* \* \* \* \*